United States Patent
Meredith-Jones et al.

(10) Patent No.: US 9,052,733 B2
(45) Date of Patent: Jun. 9, 2015

(54) MAXIMUM POWER POINT TRACKER

(75) Inventors: Scott Alan Meredith-Jones, Newtown (GB); Stephen Turner, Shrewsbury (GB); Michael Cade, Newtown (GB)

(73) Assignee: CONTROL TECHNIQUES LTD, Newtown (GB)

(*) Notice: Subject to any disclaimer, the term of this patent is extended or adjusted under 35 U.S.C. 154(b) by 226 days.

(21) Appl. No.: 13/566,735

(22) Filed: Aug. 3, 2012

(65) Prior Publication Data

US 2013/0057069 A1  Mar. 7, 2013

(30) Foreign Application Priority Data

Aug. 4, 2011  (GB) .................................. 1113519.1

(51) Int. Cl.
G05F 1/10 (2006.01)
H02J 3/12 (2006.01)
H02M 3/24 (2006.01)
H02M 7/44 (2006.01)
H02M 7/68 (2006.01)
H02M 5/42 (2006.01)
H02M 7/537 (2006.01)
G05F 1/67 (2006.01)
H02J 3/38 (2006.01)

(52) U.S. Cl.
CPC . *G05F 1/67* (2013.01); *Y02E 10/58* (2013.01); *H02J 3/385* (2013.01)

(58) Field of Classification Search
CPC ............ G05F 1/67; H02J 3/382; H02J 3/383; H02J 3/385; Y02E 10/50; Y02E 10/56; Y02E 10/563; Y02E 10/58
USPC ......... 323/207–211, 271–275, 282–285, 299, 323/303, 351, 906; 363/16–21.01, 40–43, 363/95, 97, 98, 131–134; 136/206; 320/101
See application file for complete search history.

(56) References Cited

U.S. PATENT DOCUMENTS

| | | | |
|---|---|---|---|
| 5,682,305 A * | 10/1997 | Kurokami et al. | 363/79 |
| 7,960,863 B2 | 6/2011 | Fife et al. | |
| 2005/0002214 A1* | 1/2005 | Deng et al. | 363/131 |
| 2010/0176771 A1* | 7/2010 | Fieldhouse et al. | 323/234 |
| 2010/0265747 A1* | 10/2010 | Egiziano et al. | 363/132 |

* cited by examiner

*Primary Examiner* — Timothy J Dole
*Assistant Examiner* — Carlos Rivera-Perez
(74) *Attorney, Agent, or Firm* — Harness, Dickey & Pierce, P.L.C.

(57) ABSTRACT

A method is provided for determining a value for an electrical output of a converter of renewable energy. The method comprises obtaining a signal representing the electrical output of the converter wherein that electrical output has an initial value. The method further comprises applying a pulse signal to the signal representing the electrical output, wherein the pulse signal comprises a positive portion and a negative portion. The method further comprises obtaining a measurement of electrical power produced by the converter during application of the pulse signal, removing the pulse signal and then obtaining a measurement of electrical power produced by the converter in the absence of the pulse signal. An error value is determined from the obtained electrical power measurements and that error value is applied to the initial value to obtain a target value for the electrical output of the converter.

22 Claims, 7 Drawing Sheets

MAXIMUM POWER POINT TRACKER

CROSS-REFERENCE TO RELATED APPLICATION

This application claims the benefit and priority of Great Britain Application No. GB 1113519.1, filed Aug. 4, 2011. The entire disclosure of the above application is incorporated herein by reference.

FIELD

This invention relates to a system and method for monitoring the output power for a source of electrical power derived from renewable energy. It relates particularly but not exclusively to solar energy.

BACKGROUND

Solar energy is converted into electrical energy using a photovoltaic (PV) cell. Banks of such cells are often deployed together as a PV array. The electrical output of a PV array is typically fed into an AC supply grid. The direct current (DC) voltage of the array is converted into the alternating current (AC) voltage of the supply grid by a bulk inverter or grid-tie inverter. The grid-tie or bulk inverter is used to make the electrical power supplied to the grid of the correct frequency and voltage. A known range of grid-tie inverters is manufactured by Control Techniques of Newtown, Powys, Wales. Electrical energy is also sometimes supplied to a DC storage network instead of an AC grid.

For a given level of irradiation (exposure to the sun) and temperature, each PV cell and PV string, panel or array has an optimal DC operating voltage which can be found and followed using an automated maximum power point (MPP) tracking algorithm running in an associated power processing system.

An MPP (Maximum Power Point) tracker is a standard requirement in all PV systems whether it is resident in a bulk grid-tie power inverter or in discrete DC-DC converters at the end of each string of PV cells within a solar array. Its purpose is to track the optimal power point for the solar array's temperature and the level of irradiation coming from the sun, as a result of which the DC voltage from the solar array is regulated, in order to get the best overall power from the system.

A decrease in temperature will increase the optimal DC voltage (MPP $V_{DC}$) calculated by an MPP tracker for a solar cell, string, array or panel, as will an increase in irradiation. Conversely an increase in temperature or a decrease in irradiation will reduce the MPP $V_{DC}$. When the irradiation level changes by a large amount, this will only cause a relatively small change in MPP $V_{DC}$.

Figure 1:
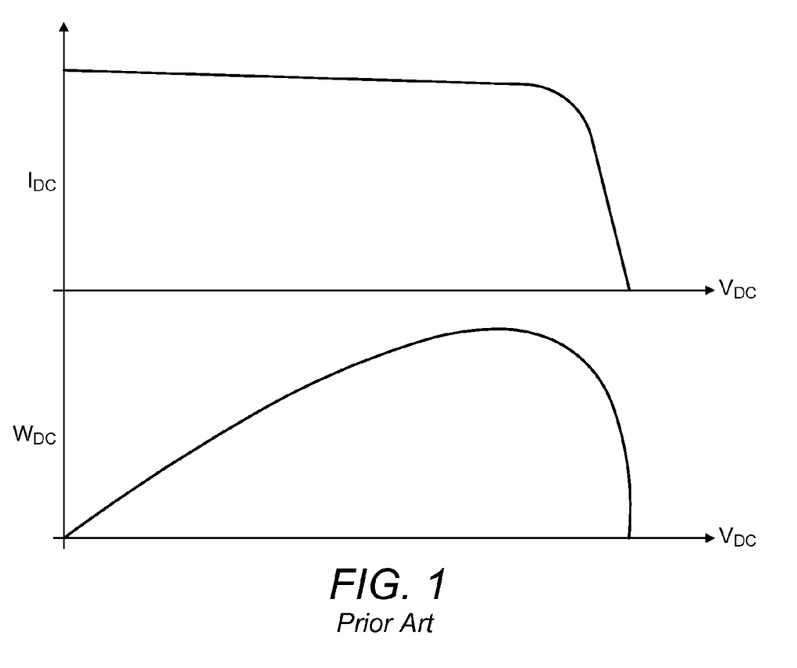
FIG. 1 shows the voltage, current, and power of a typical solar array.

FIG. 1 shows the relationships between the DC voltage provided by a typical solar array ($V_{DC}$) and its current ($I_{DC}$) and power ($W_{DC}$). As can be seen from FIG. 1, the relationships (or so called "power characteristic") for a typical solar array are not linear, and therefore a simple PID controller cannot be used to control voltage across the array since, depending on the present value of $V_{DC}$, a positive increase in voltage could lead to either a positive or negative change in power ($W_{DC}$). To solve this problem a common industrial technique called Perturb and Observe (P&O) is conventionally employed, whereby a following error term is derived by modulating a test pattern on top of the regulated $V_{DC}$ level for a solar array, in order that power can be measured when the modulated $V_{DC}$ is positive and negative with respect to the present MPP $V_{DC}$.

Figure 2:
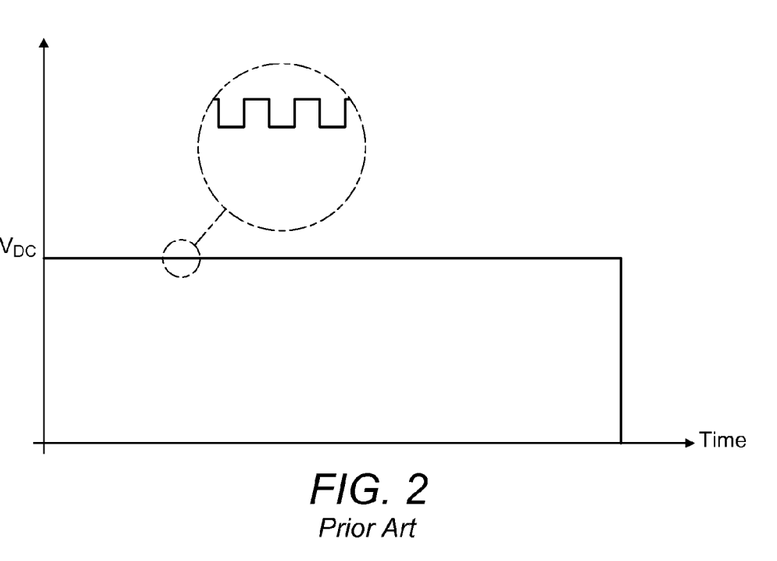
FIG. 2 shows a regulated voltage level for a solar array ($V_{DC}$) modulated by a test pattern.

FIG. 2 shows the effect of a modulated test pattern being applied to the regulated voltage level ($V_{DC}$) for a solar array.

According to conventional P&O techniques the array's average power is sampled during the positive and negative test pulse periods and combined to form a following error term which has both magnitude and direction. The following error term can be used to adjust the MPP $V_{DC}$ by a particular amount, in either a negative or positive direction, and thus set the MPP $V_{DC}$ for an upcoming period of time.

However, using the P&O method alone can lead to inaccurate results when there is a significant power change due to irradiation, since the power change caused by the test pattern will become swamped by the effect of the power change due to irradiation, giving a false following error value. This can lead to the MPP tracker changing MPP $V_{DC}$ in the wrong direction.

Changes in irradiation which can lead to a significant power change in a solar array are common. Therefore conventional systems which use P&O control for MPP tracking are prone to error. This reduces the overall efficiency and cost effectiveness of the solar array.

According to an aspect a method is provided for determining a value for an electrical output of a converter of renewable energy. The method comprises obtaining a signal representing the electrical output of the converter, wherein that electrical output has an initial value, and applying a pulse signal such as a modulated test pattern to the signal representing the electrical output wherein the pulse signal includes at least a first positive portion and a second negative portion. The positive and negative portions should preferably be of equal magnitude. The method further comprises obtaining a measurement of electrical power produced by the converter during application of the pulse signal and then removing the pulse signal from the signal representing the electrical output. The method further comprises obtaining a measurement of electrical power produced by the converter in the absence of the pulse signal and using said measurements of electrical power to obtain an error value wherein said error value is applied to the initial value of the electrical output of the converter in order to obtain a new target value for the electrical output of the inverter.

Because measurements of electrical power produced by the converter are obtained both during application of the pulse signal and in the absence of the pulse signal, the effects of ambient conditions such as the changes in level of irradiation can be taken into account when determining a target value for the electrical output of the inverter.

The method can further comprise controlling the electrical output of the converter to be equal, or be as close as possible, to a predetermined initial value before the pulse signal is applied and/or controlling the value for the electrical output of the converter to be equal, or be as close as possible, to the target value that has been determined. Therefore the operation of the converter, such as a solar array, can be controlled in accordance with the target value which has been determined.

According to an aspect an electrical power generating system is provided. The electrical power generating system comprises a converter of renewable energy into electrical power and includes means for providing a signal indicative of the electrical power available from the converter, means for providing a signal indicative of the voltage output by the converter, means for applying a pulse signal to the signal indicative of the voltage output by the converter and determining means for calculating a target value for the voltage output by the converter.

According to an aspect a method is provided for determining a target voltage value for a solar array. The method comprises setting the voltage level for the array to an initial value, applying a modulated test pattern to the output voltage level for the array, wherein the modulated test pattern comprises a positive pulse, a negative pulse and a zero pulse (during which the test pattern is effectively absent). The method comprises obtaining a positive perturbation value for the positive pulse of the test pattern, obtaining a negative perturbation value for the negative pulse of the test pattern, and obtaining an irradiation power change value representing a change in power due to irradiation during the zero portion of the test pattern. The method further comprises obtaining an error value from the difference between the irradiation power change value and a combination of the positive and negative perturbation values. Optionally, the method can further comprise applying said error value to the initial value of the output voltage for the array to determine a new target value and, optionally, controlling the output voltage of the array to equal or be as close as possible to that new target voltage.

Because both perturbation values and an irradiation power change value are used in the calculation of the error value, a conventional perturb and observe (P&O) technique is combined with a consideration of the effect of change in irradiation, or exposure to the sun, on the operation of a solar array. As a result the operation of the solar array can be controlled in order to be as efficient as possible.

DRAWINGS

Embodiments will now be described by way of example with respect to the accompanying figures of which.

SUMMARY

In summary there is provided a solution for transferring the electrical energy from one or more photovoltaic (PV) cells onto an electricity grid.

The solution comprises a method and system for carrying out Irradiation Compensated Maximum Power Point (IC-MPP) tracking for an array comprising the one or more PV cells. The IC-MPP tracking combines a perturb and observe (P&O) method, which is used to determine the direction in which a target voltage for the array should be changed in order for it to operate optimally, with a method of controlling the target voltage for the array in view of the irradiation changes in the vicinity of the array.

The method is implemented by applying a pulse signal (referred to herein as a test pattern) to a controlled voltage level for the array and observing the effects of both the negative and positive portions of the test pattern and also of a "zero" portion of the test pattern, i.e. when the test pattern is effectively absent. The method uses power measurements that are readily obtained from solar arrays and/or the components that are conventionally used therewith such as inverters in order to determine an error value that can be applied to a first voltage value in order to obtain an updated target voltage value for the array.

The method allows the effects of irradiation and the effects of the negative and positive pulses of the test pattern to be accounted for equally in the calculation of the error value, without having to assign equal lengths of time to the application of the test pattern and the absence of the test pattern when obtaining measurement values in practice. The test pattern can be of any suitable shape, with a constraint that the positive pulse should be of equal magnitude to the negative pulse. The method recognises that measurement values such as the values of current, voltage and power for a solar array will take time to settle after the change, addition or removal of a test pattern or a pulse from a voltage signal for a solar array. Therefore the method ensures that measurements are taken at suitable points during or after application of the test pattern, once the measured values have settled sufficiently.

The solution is therefore a straightforward and effective way to calculate a target value for the voltage level of a solar array, as a result of which the operation of the array can be controlled so that its output voltage equals or is as close as possible to that target voltage. Hence the method enables optimally efficient operation of the solar array.

DETAILED DESCRIPTION

A system and method for providing Irradiation Compensated Maximum Power Point (IC-MPP) tracking for a solar array is provided. In order to determine the optimal DC operating voltage (MPP $V_{DC}$) for a PV cell, cells, string, array or panel (referred to hereinafter as a solar "array"), the system measures the effect of change in irradiation on the array's output power and combines this with a Perturb and Observe (P&O) technique in order to provide a modified error value. The modified error value can be used to amend the array's DC voltage level. Therefore the true change in Maximum Power Point for the array is tracked and its voltage is regulated accordingly.

As the skilled person will be familiar with, the voltage for a PV cell can be varied by applying a resistance (load) across an output of the cell. This in practice defines the current that the grid tie inverter should draw from the cell for supply to an electricity grid in order to get the maximum possible power from the PV cell at any given time, since power is equal to the voltage times the current for the cell.

A grid-tie inverter controls the array DC voltage by means of a DC voltage control loop, wherein a DC bus voltage set point is compared against the actual DC bus voltage to develop a DC voltage error term i.e. $V_{DC}$ Error=$V_{DC}$ Setpoint−$V_{DC}$ Feedback. This error term is input to a standard PID control algorithm, whose output directly changes the current drawn from the PV Array and sent to the AC grid. In this way DC voltage is controlled inversely proportional to current demand where an increasing current demand will cause a decrease in voltage, and a decreasing current demand will cause an increase in DC voltage.

Figure 3:
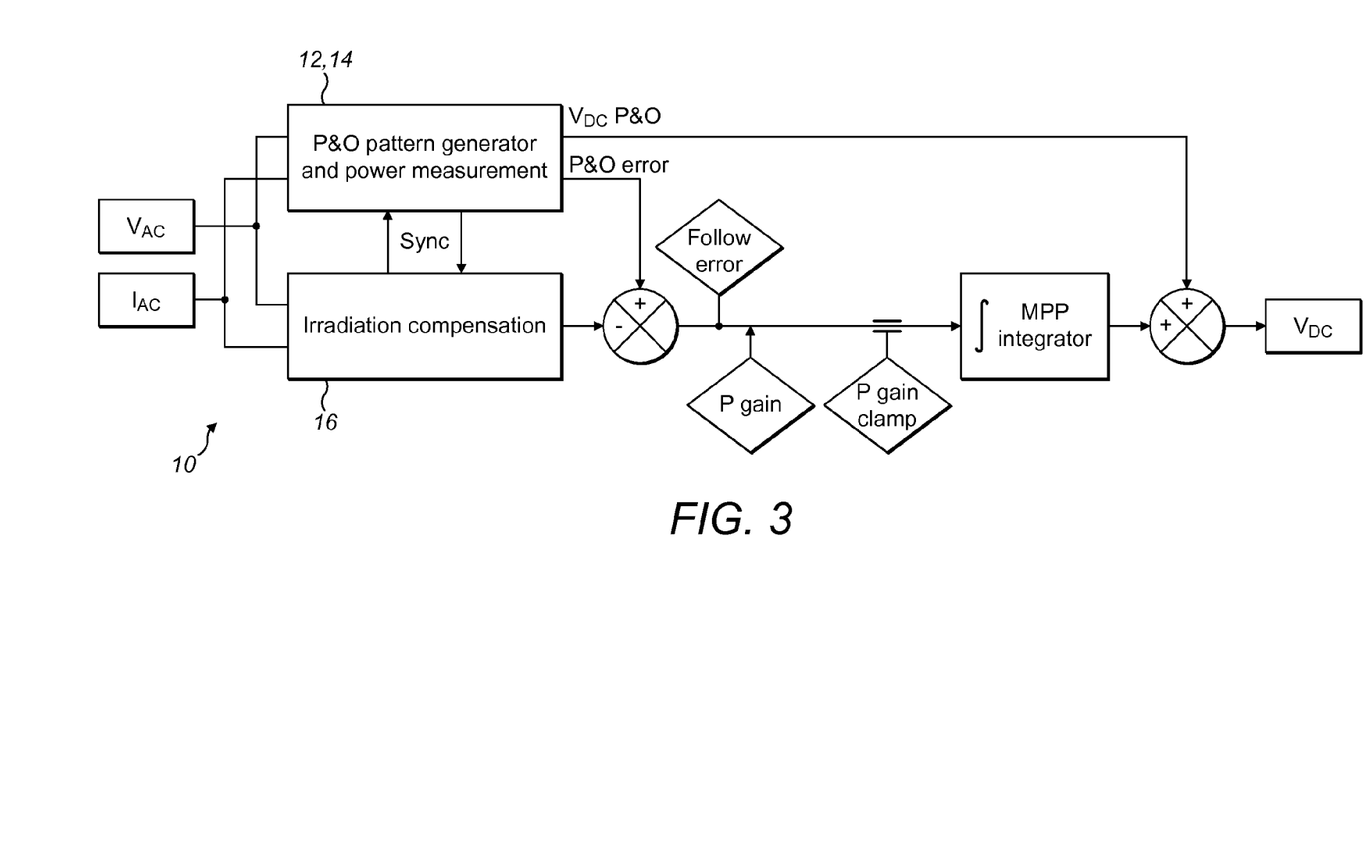
FIG. 3 shows schematically a system for irradiation compensated maximum power point (IC-MPP) tracking.

FIG. 3 shows an IC-MPP system 10 for a solar array. The system 10 can be implemented in any suitable processor or controller, using any suitable software and/or hardware means. For example it may be implemented by a bulk power inverter or grid-tie inverter which operates for an entire PV panel or it may be implemented by one or more discrete DC-DC converters at the end of respective PV cell strings.

The system 10 aims to regulate the voltage $V_{DC}$ for the array to be equal to, or as close as possible to, an optimal voltage (MPP$V_{DC}$) which it calculates using IC-MPP tracking.

The system 10 shown in FIG. 3 uses the AC current and voltage for the grid to which the solar array supplies electricity as inputs. However it is possible to instead use DC inputs in order to implement the method described herein. As will be better understood from the detailed description below, the current and voltage measurements are used in order to obtain measures of power and power change. Therefore whether AC or DC current and voltage measurements are used should not affect the outcome. In practice, AC components are typically available in bulk inverters that are used in conjunction with solar arrays and therefore it may be more convenient in such situations to make use of the AC voltage and current measurements. In an alternative setup where the DC components are readily available and the AC components are not readily available, it would be more convenient to make use of the DC components.

The system 10 includes a P&O pattern generator 12 for generating a test pattern for modulating the regulated voltage $V_{DC}$ across the array for a finite period of time. Details regarding the form of test pattern used are given below. The system 10 further includes power measurement means 14 for measuring the power output by the array over time. In addition, an irradiation compensation means 16 is provided. The irradiation compensation means 16 is synchronised or otherwise combined with the P&O pattern generator 12 and with the power measurement means 14 in order to provide enhanced maximum power point (MPP) tracking for the array as described in more detail below. As a result, the system 10 can calculate a more accurate value of the optimal voltage for the array (MPP $V_{DC}$) and the DC voltage across the array can be regulated accordingly.

Figure 4:
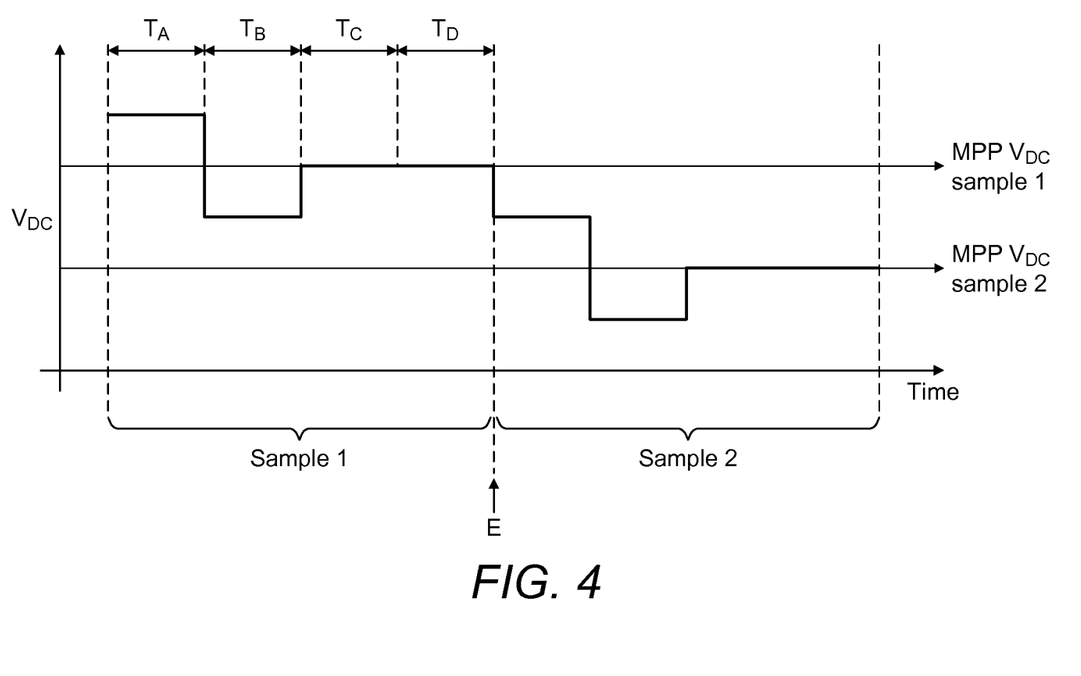
FIG. 4 shows the application of a modulated test pattern to a regulated voltage level over first and second time periods.
Figure 5:
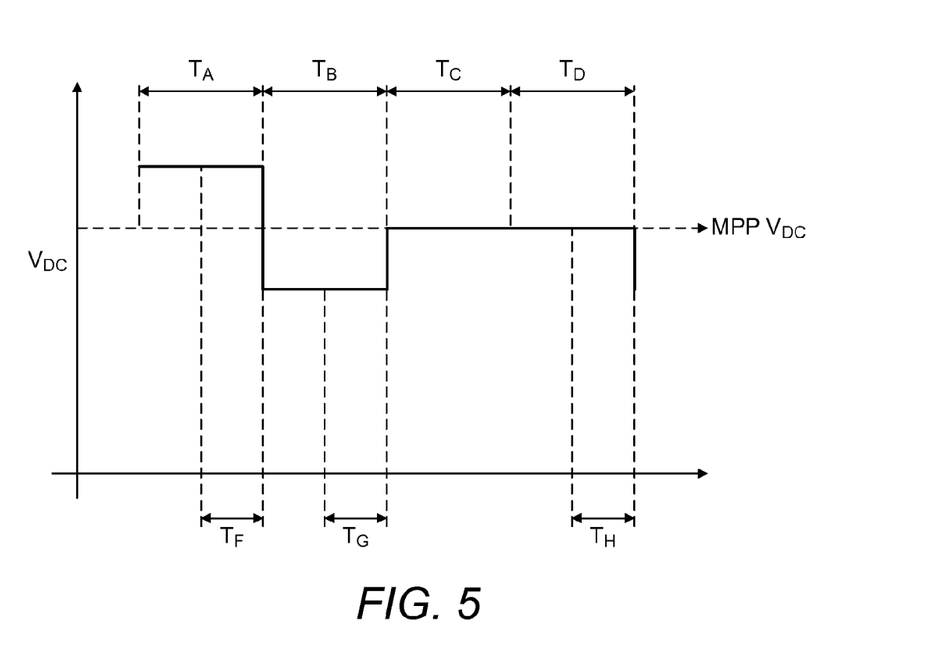
FIG. 5 shows a more detailed view of the modulated test pattern applied in FIG. 4.

The IC-MPP tracking can be further understood with respect to FIGS. 4 and 5. FIG. 4 shows the shape of a modulated test pattern which is applied to the regulated DC voltage for a solar array over first ("sample 1") and second ("sample 2") successive periods of time. As can be seen therein, the MPP $V_{DC}$ is set to a first level for the first respective period of time. The modulated test pattern is applied to the regulated voltage signal over that first period of time, denoted in FIG. 4 as "sample 1". Power measurements for the array over the first period of time are taken and used to determine the new optimal voltage (MPP $V_{DC}$) to which the voltage of the array should be regulated for the second, subsequent period of time, denoted in FIG. 4 as "sample 2".

In FIGS. 4 and 5 the test pattern is shown as comprising square shaped positive and negative pulses and a "zero" portion, during which the test pattern does not change the regulated voltage level and so is effectively absent. However the negative and positive pulses of the test pattern could in fact take on a different shape. For example, the pulses could be triangular, trapezoidal or sinusoidal in shape. A sinusoidal shape may in fact be preferable to a square shape in practice, since the initial voltage change when the positive part of the sinusoidal test pattern is applied is less steep than it would be for a corresponding square wave and so it would not draw such a large current. Any other suitable shape of negative and positive pulses could be used without departing from the method described herein. The shape should be symmetrical so that the positive and negative parts of the test pattern have the same magnitude. As can be seen in FIGS. 4 and 5, the positive and negative pulses immediately follow one another by transitioning directly from one to the other. There is no zero portion where the test pattern is absent between the positive and negative pulses. In the example of square pulses as shown, the two pulses step from one to the other with no delay.

Referring again to FIG. 4, the modulated test pattern is split into four temporal sections: $T_A$, $T_B$, $T_C$, $T_D$.

$T_A$ is the time over which the positive pulse of the P&O test pattern is applied to the regulated voltage signal $V_{DC}$. $T_B$ is the time over which the negative pulse of the P&O test pattern is applied to $V_{DC}$. The power of the array is measured during both $T_A$ and $T_B$ in order to monitor the effect of the increase and decrease in voltage on the power output by the array.

After $T_B$ the test pattern is removed (i.e. its value is reduced to zero) and the voltage level is allowed to settle. $T_C$ follows $T_B$ and is a "dwell time" to allow the DC voltage level to return to the MPP $V_{DC}$ which was predetermined for the "sample 1" time period. The length of $T_C$ depends on the response time of the system. Specifically, dwell time, $T_C$ may be set to a value to allow time for the controller to respond to the P&O test pattern and return the DC voltage level to the predetermined MPP VDC when the test pattern is removed. For example, slower systems will require a longer time period $T_C$ for the DC voltage level to return to the predetermined MPP VDC. Conversely, faster systems will require a shorter time period $T_C$ for the DC voltage level to return to the predetermined MPP VDC. With a short time period $T_C$, subsequent measurements of the power output of the system occur closer in time to the measurements during $T_A$ and $T_B$ and are hence more relevant to the previous power measurements taken during $T_A$ and $T_B$. $T_C$ may be equal to zero with a system having a fast response time as explained below. Hence, the dwell time may be varied to suit the application.

After the dwell time $T_C$ (if any) has ended, the voltage remains at MPP $V_{DC}$ and further measurements of the array output power are taken during time $T_D$, referred to herein as the "irradiation period", which follows immediately after $T_C$. Because there is no negative or positive test pulse applied to the voltage signal during time $T_D$, any power change encountered during that time should be due to irradiation. As mentioned above, for faster systems wherein a shorter value of $T_D$ is sufficient to allow the DC voltage level to return to the predetermined MPP $V_{DC}$ after the P&O test pattern has been removed, the measurements of the array output power taken during time $T_D$ are more relevant to the previous power measurements taken when the P&O test pattern was applied. Therefore, a shorter value of $T_C$ has an advantage of increasing the relevance of measurements taken due to irradiation when the test pulse is effectively absent ($T_D$) to the power measurements taken during the positive ($T_A$) and negative ($T_B$) pulses of the test pattern. With increased relevance, more accurate power point tracking is achieved.

In the test pattern shown in FIG. 4, $T_A=T_B=T_D$. It is possible for the temporal length of $T_A$, $T_B$ and $T_D$ to differ from one another for the purpose of applying the test pattern and taking measurements. However for calculation purposes, the details of which are discussed below, the measurement values obtained during $T_A$, $T_B$ and $T_D$ should be manipulated so as to have a common time base, to allow a fair comparison to be made between the measurements taken during each temporal section. For example, measurements in each temporal section could be manipulated to give a value per unit time, wherein the same unit was used for each of $T_A$, $T_B$ and $T_D$.

The system 10 processes the power measurements obtained during times $T_A$ to $T_D$ in order to obtain a modified error value and calculate a new value of MPP $V_{DC}$. At point E in FIG. 4 the MPP $V_{DC}$ for the array is updated to the new value for the subsequent "sample 2" time period. The modulated test pattern is applied to the voltage signal for the sample 2 test period in the same manner as described above with respect to sample 1. Again, the system 10 processes the measured power data during the sample 2 time period and sets a new value for the optimum voltage (MPP $V_{DC}$) of the array at the end of that time period.

Because power measurements are taken for each sample period both during the application of negative and positive pulses to the regulated voltage, and during a time at which the regulated voltage is not altered by a test pulse, the IC-MPP tracking can take the effect of irradiation changes into account and can determine how the voltage of the array should be regulated in order to enhance its power output at any given time. In particular, the IC-MPP tracking can determine whether to increase or decrease the value of the optimal array voltage (MPP $V_{DC}$) for a subsequent time period. The operation of individual PV cells or strings can thus be dynamically controlled in order to (try to) provide that optimal voltage at any given time.

As shown in FIG. 5, each of temporal sections $T_A$, $T_B$ and $T_D$ within the modulated test pattern can be further split into two sub-sections. Power values for the array are obtained throughout $T_A$, $T_B$ and $T_D$. In addition, the measurement values obtained during one of the two sub-sections within each temporal section are used to obtain an average power value for that temporal section. The averaging preferably is applied to measurements obtained during the latter part of each temporal section in order to allow some time for measurement conditions to settle before the averaging takes place.

The "power averaging" sub-sections within temporal sections $T_A$, $T_B$ and $T_D$ are shown in FIG. 5 as time periods $T_F$, $T_G$ and $T_H$ respectively. In the examples shown in FIG. 5, $T_F=T_G=T_H$. As a result, the proportion of the temporal section that is used for power averaging is the same for each of $T_A$, $T_B$ and $T_D$.

For the purpose of obtaining measurements during operation of the solar array, it is not essential that $T_F=T_G=T_H$. But the values that are obtained and averaged within each of those subsections should be manipulated so as to have a common time base, and thus be directly comparable to one another, before those values are used in calculation of the error value for updating the level of the regulated voltage signal for the solar array. The values of $T_F$, $T_G$ and $T_H$ may be varied to suit the application, and ideally will be as short as possible so that system fluctuations are minimal during these times.

$T_F$ is the sub-section within temporal section $T_A$ for which the measured power values during the positive pulse of the P&O test pattern are averaged. The resulting average power during time $T_F$ is denoted herein as $P_P$.

$T_G$ is the sub-section within temporal section $T_B$ for which the measured power values during the negative pulse of the P&O test pattern are averaged. The resulting average power during time $T_G$ is denoted herein as $P_N$.

Power values are obtained throughout $T_D$. In addition, $T_H$ is the sub-section within temporal section $T_D$ for which a measure of power change due to irradiation effects is obtained. In an ideal system, the DC voltage level returns to the DC voltage level corresponding to the predetermined MPP $V_{DC}$ immediately after the P&O test pattern is removed, and therefore the response time of the system is instant. In such systems, and also in systems where the response time is fast, $T_C$ is not required since the time ($T_D-T_H$) is long enough to allow the voltage level to settle. However, for systems where ($T_D-T_H$)<the time to allow the voltage level to settle, $T_D$ is required to account for slower system response times, as explained above. A measure of average power for the solar array is obtained during $T_D$ and an average value of the peak power is obtained for a shorter period, $T_H$. The averaged peak power during period $T_H$ is denoted herein as $P_I$. A comparison is made between the average power and the averaged peak power to give a direction and magnitude of power change due to any changes in irradiation during $T_D$.

The average power for the solar array over the total P&O pulse period, including both negative and positive pulses, is calculated from measured power values obtained throughout time sections $T_A$ and $T_B$ and is denoted herein as $PA_{P\&O}$. The negative and positive pulses are preferably applied such that there is no delay between the negative (or positive) pulse and the subsequent positive (or negative) pulse as shown in FIGS. 4 and 5. By keeping the time between subsequent pulses as short as possible, more relevant and therefore more accurate power measurements may be obtained at $T_A$ and $T_B$ as external effects on the system will remain roughly constant during the time when the measurements are taken. An accurate average time value can be obtained since any anomalous values obtained, for example, as a result of system distortions or overshoot when the applied voltage signal of the test pattern is still settling at the beginning of periods $T_A$ and $T_B$ respectively are equal and opposite across the positive and negative pulses of $T_A$ and $T_B$ and should effectively cancel one another out. The average power for the solar array over the total irradiation measurement period ($T_D$) is also calculated and denoted herein as $PA_I$.

As mentioned above, the IC-MPP tracker calculates an updated value for the optimal voltage (MPP $V_{DC}$) for the solar array taking both the perturb and observe (P&O) measurements and irradiation measurements into account. It does this by calculating an error value and applying it to the current value of MPP $V_{DC}$ in order to calculate a new, updated value for MPP $V_{DC}$. It has been found that the error value can be calculated from the above-described power measurements according to the following relationship:

$$\text{Error Value}=(P_P-PA_{P\&O})+((P_N-PA_{P\&O})*-1)-((P_I-PA_I)*2) \qquad (1)$$

It can be seen that the first term in equation 1 above is a perturbation result from temporal section $T_A$. It comprises the difference between the average power during the positive pulse and the average power over the total perturb and observe (P&O) pulse period, including both negative and positive pulses.

The second term in equation 1 is a perturbation result from temporal section $T_B$. It comprises the difference between the average power during the negative pulse and the average power during the total P&O pulse period, including both negative and positive pulses.

The third term in equation 1 above represents the power change experienced due to irradiation within time period $T_D$. It has a magnitude and also a direction (either positive or negative). It comprises the difference between the averaged peak power during $T_H$ and the average power over the total irradiation period, $T_D$. This difference value is multiplied by two within the third term in equation 1 to give a true measure of the change in power due to irradiation, as can be understood further from FIG. 7 herein.

Figure 7:
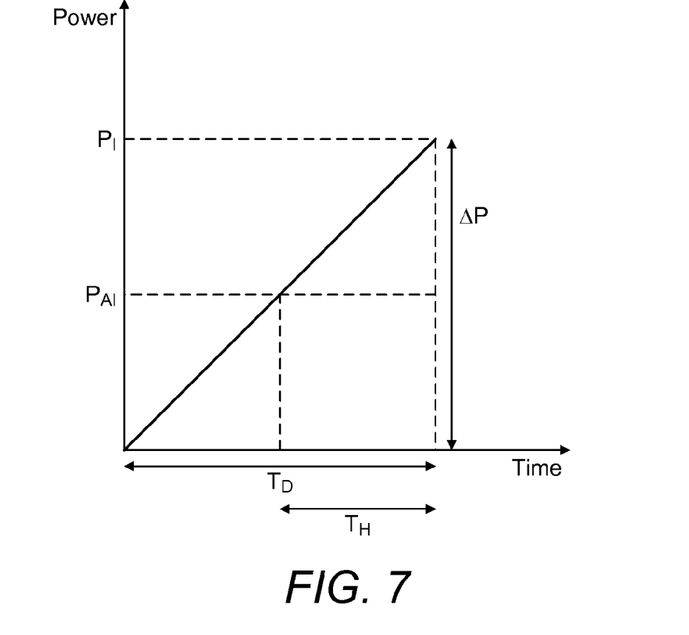
FIG. 7 shows a power change due to irradiation over time.

In the example of FIG. 7, irradiation changes during time period $T_D$ cause a substantially constant rise in output power for the solar array. When the output power is averaged over time period $T_D$ to give $PA_I$, the value of $PA_I$ will be (approximately or exactly) half the value of the peak power during time period $T_D$. The value for $PA_I$ will therefore be (approximately or exactly) half of the value of the averaged peak power $P_I$, obtained during period $T_H$. Therefore the difference between the value of $PA_I$ and $P_I$ is actually only (approximately or exactly) half the value of the actual change in power ($\Delta P$) experience during time $T_D$ due to the irradiation changes. Therefore the difference value in the third term in equation 1 above is multiplied by two to account for this.

In the example shown in FIG. 7 the power for the array rises as a result of irradiation changes during time $T_D$, however it will be appreciated that a decrease in power may be experienced during $T_D$ due to irradiation changes and the manner in which the power change due to that irradiation can be calculated is equivalent to the method described above in relation to FIG. 7. Furthermore, in FIG. 7 the power is shown as rising at a constant rate over time due to irradiation changes during $T_D$. It will be appreciated that power may not rise at an exactly constant rate during time period $T_D$, and in fact both negative and positive power fluctuations may be experienced due to irradiation changes during time period $T_D$. However it has been found that equation 1 above still gives good results for irradiation compensated maximum power point tracking even if power changes due to irradiation during time period $T_D$ are non-constant or fluctuating.

It will be appreciated that equation 1 gives equal weighting to each of the first, second and third terms. This is based on the assumption that the time period for the positive pulse of the test pattern ($T_A$), the time period for the negative pulse of the test pattern ($T_B$) and the irradiation period ($T_D$) are all equal in length, or that they are of different lengths but the measurement values have already been manipulated to provide a common time base as described above.

The error value can be calculated from power measurements that will be commonly available for the solar array. As the skilled person will recognise, AC or DC current and voltage values will always be available and therefore it will be possible to calculate power at any given time. Calculation of the error value therefore does not require measurements from any sensors in the field in the vicinity of the solar array or from any other complex technical equipment. Furthermore, there is no need for a complicated microcontroller to run the measurements and calculations in order to obtain the error value. Therefore the solution provided herein can readily be implemented without incurring significant cost and without introducing any new physical components to the solar array.

Figure 6:
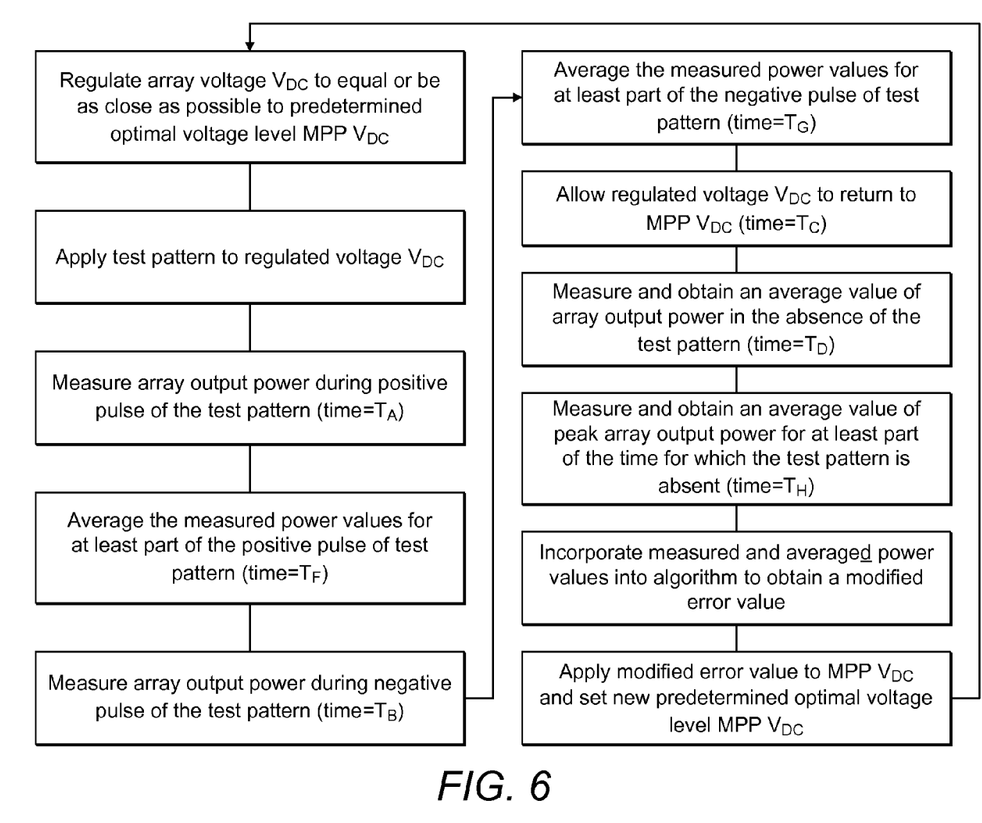
FIG. 6 shows a flow chart for an IC-MPP tracking process.

The above-defined error value can be used to dynamically update the optimal voltage level (MPP $V_{DC}$) for the solar array during operation of the array. This is shown in the flow diagram in FIG. 6 herein. The voltage level produced by PV cells in the array can then be regulated to equal, or be as close as possible to, MPP $V_{DC}$. By controlling operation of PV cells within the array according to this control technique, the efficiency of the array can be maintained at a high level. Therefore the array can provide electricity for an electricity grid, via a grid connected inverter, cost effectively. This control technique takes into account the temperature of the solar array and the level of irradiation coming from the sun throughout operation of the array. Therefore a highly useful technique for monitoring the output power for a source of electrical power from renewable resources is provided.

The voltage for a PV cell or cells in a solar array can be controlled to equal or be as close as possible to the target value using any appropriate means. A resistance can be applied to the PV cell or solar array to alter its voltage in any suitable manner, as will be familiar to the skilled reader.

The solution provided herein can be applied to any size of solar array, from a single PV cell to a plurality of PV panels or larger. This solution is therefore scalable and so can provide increased efficiency and improved cost effectiveness for solar electricity sources in a range of different locations and environments.

The above-described system is optimised such that the test pattern is as short as possible. This is achieved by minimising unnecessary wait times, specifically avoiding delays between the positive and negative pulses of the test pattern and by optimising the length of the "dwell" time $T_C$ which is preferably zero. By having a faster test pattern, the tracking accuracy is improved as the frequency by which the optimal voltage level (MPP $V_{DC}$) is dynamically updated is increased because the sample times (as shown in FIGS. 4 and 5) are reduced. The energy transfer from the PV cells is therefore more efficient. Furthermore, with a shorter period over which the P&O test pattern is repeated, errors in the irradiation compensation are reduced because the measurement taken during $T_D$ is more relevant to the previous measurements taken during $T_A$ and $T_B$. This negates the need for external sensors to measure environmental and other conditions to correct for these errors. Such sensors significantly increase the cost of an MPPT system, while also adding complexity and reducing the reliability of the overall system.

Figure 8:
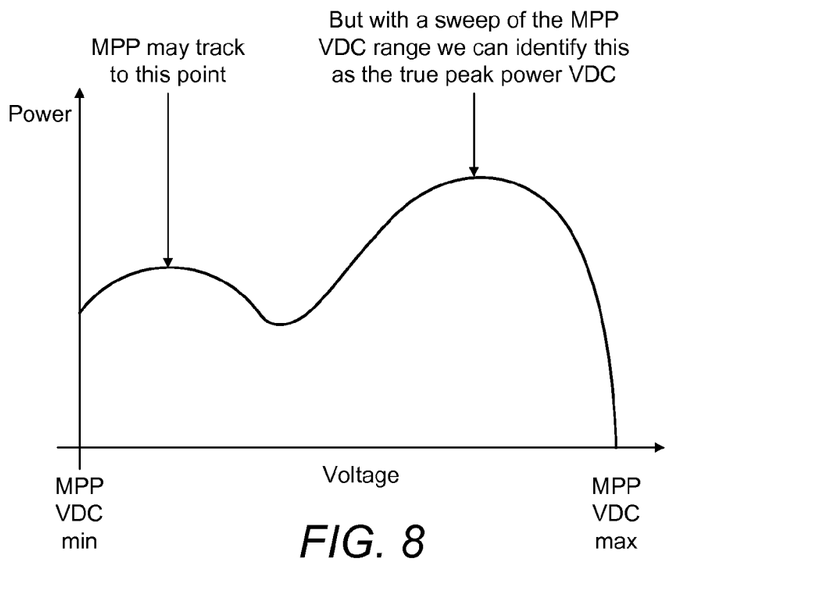
FIG. 8 shows a range of MPP $V_{DC}$ for a solar array under partial shading.
Figure 9:
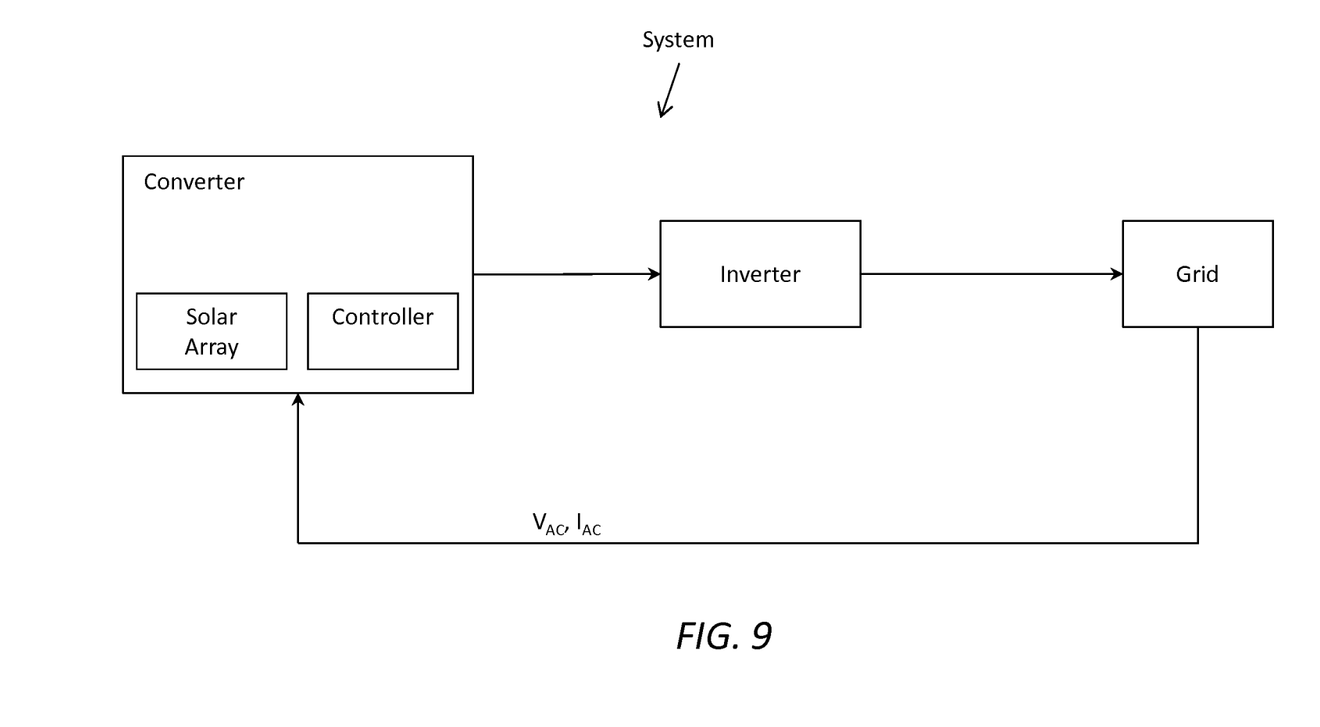
FIG. 9 shows a block diagram of an electrical power generating system including a converter having a solar array and a controller, an inverter and a grid according to one example embodiment.

In practice when the solar array comprises more than one PV cell the array may be subject to partial shading effects wherein some PV cells within the array are less exposed to the sun than certain of the other PV cells in the array are. In such a situation it possible to detect false peaks in power for the array at particular values of DC voltage. In order to overcome this, for example when setting an initial voltage level for the array before beginning the IC-MPP tracking described above, it is possible to perform a sweep of the DC voltage range for the array to determine the optimal peak in the power curve. As shown in FIG. 8 herein, performing such a sweep will ensure that the true maximum peak power, and hence the true MPP $V_{DC}$ can be determined at any given time. Subsequent tracking can then begin at or near this identified peak and can be carried out as discussed in detail above.

In practice, the IC MPP tracking and voltage control described herein can be implemented using any suitable hardware or software means. The control maybe run by a computer such as a laptop or personal computer (PC), a microcontroller, a programmable logic controller (PLC) or any other suitable industrial controller.

A system or computer such as a general purpose computer can be configured or adapted to perform the described methods. In one embodiment a system comprises a processor, memory and a display. Typically these are connected to a central bus structure, the display being connected via a display adapter. The system can also comprise one or more input devices such as a mouse and/or a keyboard and/or a communications adapter for connecting the computer to other computers or networks. The input devices are also typically connected to the central bus structure, the input device being connected via a suitable input device adapter.

The system can, as described above, be part of or be operated in conjunction with an inverter which converts DC electricity produced by a solar array to AC electricity for supply to a grid. The processor may also be used for controlling other operational aspects of the inverter or other components. The processor may also be used for recording and/or storing data relating to the IC-MPP tracking and/or relating to other operation.

Instructions for controlling the IC-MPP tracking may be recorded in a digital or analogue record carrier or computer readable medium, for example a carrier disk or carrier signal.

The computer readable medium can have computer executable instructions adapted to cause the computer to perform the described methods.

A magnetic record carrier such as a computer hard drive may be used for storage of instructions for controlling the IC-MPP tracking. Alternatively, solid state storage or any suitable signal recording may be employed.

A computer program may be provided for implementing the IC-MPP tracking. Such computer implementation may be used to provide automated IC-MPP tracking for a solar array. Alternatively or additionally, the IC-MPP tracking may be carried out using any suitable combination of automated and user implemented steps.

Embodiments have been described by way of example only. It will be appreciated that variations may be made without departing from the inventive concept(s) described herein.

Also disclosed is:

The IC-MPP tracking and voltage control described herein implemented using a computer. The control may be implemented by a controller comprising any of: a microcontroller; a programmable logic controller (PLC); a laptop computer; or a personal computer (PC).

A processing means programmed and operable to execute the instructions for carrying out the control.

An inverter comprising the processing means. The inverter may be a grid-tie inverter.

A record carrier having instructions stored thereon for execution by a processing means to carry out the control. The record carrier may include an optical, magnetic or solid state storage means or a readable signal.

A computer program including instructions executable by a processing means for carrying out the control.

A system comprising a memory and a processor, wherein the processor is arranged to perform the control.

What is claimed is:

1. A method for determining a value for an electrical output of a converter of renewable energy, the method comprising:
    obtaining a signal representing the electrical output of the converter, wherein said electrical output has an initial value;
    applying a pulse signal to the signal representing the electrical output, said pulse signal including at least a first, positive portion and a second, negative portion, wherein the two portions transition directly from one to the other;
    obtaining a measurement of electrical power produced by the converter during application of the pulse signal;
    removing said pulse signal from the signal representing the electrical output;
    obtaining a measurement of electrical power produced by the converter in the absence of the pulse signal;
    using said measurements of electrical power to obtain an error value; and
    applying said error value to the initial value to obtain a target value for the electrical output of the converter;
    wherein the error value is determined by:

Error Term=$(P_P-PA_{P\&O})+((P_N-PA_{P\&O})*-1)-((P_I-PA_I)*2)$ wherein:
    $P_P$ is an average power over a subsection of the positive portion of the pulse signal;
    $PA_{P\&O}$ is an average power over the pulse signal including both negative and positive portions;
    $P_N$ is an average power over a subsection of the negative portion of the pulse signal;
    $P_I$ is an average peak power measured during a subsection of a time period for which measurement values are obtained in the absence of the pulse signal (the irradiation period); and
    $PA_I$ is an average power over the time period for which measurements are obtained in the absence of the pulse signal (the irradiation period).

2. The method as claimed in claim 1 further comprising, before applying the pulse signal, controlling the electrical output of the converter to equal, or be as close as possible to, a predetermined initial value.

3. The method as claimed in claim 1 further comprising controlling the electrical output of the converter to equal, or be as close as possible to, said target value.

4. The method as claimed in claim 1 wherein the converter comprises a device for converting solar energy to electrical energy; and optionally, wherein the converter comprises any of: a photovoltaic (PV) cell, a plurality of PV cells, a PV string, a PV array and a PV panel.

5. The method as claimed in claim 1 wherein a first measurement of electrical power produced by the converter is obtained during the positive portion of the pulse signal and a second measurement of electrical power produced by the converter is obtained during the negative portion of the pulse signal.

6. The method as claimed in claim 1 further comprising calculating an average power value for a time period defined by any of: the positive portion of the pulse signal; the negative portion of the pulse signal; the positive and negative portions of the pulse signal; or the absence of the pulse signal.

7. The method as claimed in claim 6 wherein the average power value for one or more of said time periods is calculated using power measurement values obtained only during a respective part of said time period.

8. The method as claimed in claim 7 wherein the part of the time period for which power measurement values are used to calculate the respective average power value is of the same temporal length for each of: the positive portion of the pulse signal; the negative portion of the pulse signal; and the absence of the pulse signal.

9. The method as claimed in any of claim 1 further comprising the step of, after removing the pulse signal from the signal representing the controlled electrical output, allowing a pre-determined time period to elapse before obtaining a measurement of electrical power produced by the converter in the absence of the pulse signal.

10. The method as claimed in claim 1 wherein the step of obtaining the measurement of electrical power produced by the converter in the absence of the pulse signal comprises obtaining a measurement of average power during a first predetermined time period in the absence of the pulse signal and obtaining a measurement of average peak power during a second time period in the absence of the pulse signal; and optionally,
    wherein said second time period is a subsection of said first time period.

11. The method as claimed in claim 1 wherein the step of obtaining the measurement of electrical power produced by the converter during application of the pulse signal comprises calculating a positive power value ($P_P$) for the positive portion of the pulse signal, calculating a negative power value ($P_N$) during the negative portion of the pulse signal and calculating an average power value ($P_{AP\&O}$) over the entire pulse signal, including both positive and negative portions.

12. The method as claimed in claim 1 wherein the step of using said measurements of electrical power to obtain the error value comprises obtaining a positive perturbation value for the positive portion of the pulse signal, obtaining a negative perturbation value for the negative portion of the pulse signal and obtaining an irradiation power change value representing a change in power due to irradiation in the absence of the pulse signal.

13. The method as claimed in claim 12 wherein the error value is calculated as a difference between the irradiation power change value and a combination of the negative and positive perturbation values.

14. The method as claimed in claim 12 wherein a multiplying factor is applied to at least one of: the irradiation power change value, the positive perturbation value, or the negative perturbation value before calculation of the error value to account for differences in a temporal length between any of: the negative portion of the pulse signal, the positive portion of the pulse signal and the absence of the pulse signal.

15. The method as claimed in claim 1 wherein the value for an electrical output of the converter is a voltage value.

16. A non-transitory computer-readable medium having computer-executable instructions adapted to cause a computer system to perform the method of claim 1.

17. An electrical power generating system comprising a converter of renewable energy into electrical power, said system configured to:
provide a signal indicative of the electrical power available from the converter;
provide a signal indicative of a voltage output by the converter;
apply a pulse signal to said signal indicative of the voltage output by the converter wherein the pulse signal includes at least a first, positive portion and a second, negative portion and wherein the two portions transition directly from one to the other; and
calculate a target value for the voltage output by the converter by applying an error value, wherein the error value is determined by:

$$\text{Error Term} = (P_P - PA_{P\&O}) + ((P_N - PA_{P\&O})^* - 1) - ((P_I - PA_I)^*2)$$

wherein:
$P_P$ is an average power over a subsection of the positive portion of the pulse signal;
$PA_{P\&O}$ is an average power over the pulse signal including both negative and positive portions;
$P_N$ is an average power over a subsection of the negative portion of the pulse signal;
$P_I$ is an average peak power measured during a subsection of a time period for which measurement values are obtained in the absence of the pulse signal (the irradiation period); and
$PA_I$ is an average power over the time period for which measurements are obtained in the absence of the pulse signal (the irradiation period).

18. The system of claim 17 wherein the converter comprises a solar array including one or more photovoltaic (PV) cells.

19. The system of claim 17 further comprising a controller for controlling the voltage output by the converter to equal, or be as close as possible to, said target value.

20. The system as claimed in claim 19, wherein the system is configured to provide the signal indicative of the voltage output by the converter by creating a voltage drop across the output of the converter and providing a signal indicative of said voltage drop to the controller.

21. The system as claimed in claim 19 wherein the controller is operable to apply a resistance across an output of the converter in order to control the voltage output by the converter to equal, or be as close as possible to, said target value.

22. The system as claimed in claim 17 wherein an output stage comprises an inverter operable to change a DC output from the converter into an AC supply.

* * * * *